(12) United States Patent
Lee et al.

(10) Patent No.: US 7,995,883 B2
(45) Date of Patent: Aug. 9, 2011

(54) OPTICAL WAVEGUIDE AND BI-DIRECTIONAL OPTICAL TRANSCEIVER

(75) Inventors: Sei-hyoung Lee, Gwangju-si (KR); Hyun-seo Kang, Gwangju-si (KR); Jai-sang Koh, Gwangju-si (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 12/606,082

(22) Filed: Oct. 26, 2009

(65) Prior Publication Data
US 2010/0135614 A1    Jun. 3, 2010

(30) Foreign Application Priority Data
Nov. 28, 2008 (KR) .................. 10-2008-0120117

(51) Int. Cl.
*G02B 6/26* (2006.01)
(52) U.S. Cl. ................. 385/39; 385/31; 385/37; 385/89
(58) Field of Classification Search .................. None
See application file for complete search history.

(56) References Cited

U.S. PATENT DOCUMENTS

| | | | | |
|---|---|---|---|---|
| 4,296,995 A * | 10/1981 | Bickel | ............... | 385/47 |
| 4,314,740 A * | 2/1982 | Bickel | ............... | 385/47 |
| 4,640,574 A * | 2/1987 | Unger | ............... | 385/14 |
| 4,760,569 A | 7/1988 | Mahlein | | |
| 4,911,516 A * | 3/1990 | Palfrey et al. | ............... | 385/37 |
| 5,305,335 A * | 4/1994 | Ball et al. | ............... | 372/6 |
| 5,446,816 A * | 8/1995 | Shiraishi et al. | ............... | 385/33 |
| 5,699,377 A * | 12/1997 | Pan | ............... | 372/92 |
| 5,953,353 A * | 9/1999 | Headley et al. | ............... | 372/6 |
| 6,178,039 B1 * | 1/2001 | Fujita | ............... | 359/341.1 |
| 6,411,755 B1 * | 6/2002 | Erdogan | ............... | 385/28 |
| 6,529,661 B2 * | 3/2003 | Kropp | ............... | 385/38 |
| 6,722,793 B2 | 4/2004 | Althaus et al. | | |
| 6,869,229 B2 | 3/2005 | Reedy et al. | | |
| 7,064,891 B2 * | 6/2006 | Maeda et al. | ............... | 359/344 |
| 7,373,050 B2 | 5/2008 | Nagashima | | |
| 7,792,401 B2 * | 9/2010 | Kang et al. | ............... | 385/31 |
| 2002/0080457 A1 * | 6/2002 | Nakanishi et al. | ............... | 359/189 |
| 2002/0114260 A1 * | 8/2002 | Kasama et al. | ............... | 369/112.27 |
| 2008/0089644 A1 * | 4/2008 | Lee et al. | ............... | 385/33 |
| 2011/0002692 A1 * | 1/2011 | Lee et al. | ............... | 398/139 |

OTHER PUBLICATIONS

Chen, W.T., et al., "Laser-to-Fiber Coupling Scheme by Utilizing a Lensed Fiber Integrated with a Long-Period Fiber Grating," *IEEE Photonics Technology Letters*, vol. 12, No. 5, May 2000, pp. 501-503.

* cited by examiner

*Primary Examiner* — Mike Stahl
(74) *Attorney, Agent, or Firm* — Blakely, Sokoloff, Taylor & Zafman

(57) ABSTRACT

Disclosed are an optical waveguide and a bi-directional light transceiver, in which a wavelength selective filer is provided in the core of the optical waveguide to divide bi-directional signals, so that manual alignment of optical components are easily achieved and thus a small bi-directional light transceiver is realized and transmission/reception efficiency of light is enhanced.

16 Claims, 4 Drawing Sheets

OPTICAL WAVEGUIDE AND BI-DIRECTIONAL OPTICAL TRANSCEIVER

CROSS-REFERENCE TO RELATED APPLICATION

This application claims the benefit under 35 U.S.C. §119 (a) of Korean Patent Application No. 10-2008-0120117, filed on Nov. 28, 2008, the disclosure of which is incorporated by reference in its entirety for all purposes.

BACKGROUND

1. Field

The following description relates to an optical transmission technology, and more particularly, to an optical waveguide and a bi-directional optical transceiver.

2. Description of the Related Art

FIG. 1 is a view illustrating a conventional bi-directional optical transceiver, which performs a bi-directional optical communication using a single optical waveguide such as an optical fiber. The bi-directional optical transceiver 1 includes an optical waveguide 10, an external filter 20, a light generation unit 30 and a light detection unit 40.

The optical waveguide 10, for example, an optical fiber, is a transmission line including a core 11, an optical fiber for transmitting light and a cladding 12 surrounding the core 11 to confine light in the core 11 through total internal reflection.

The external filter 20 is configured to divide bi-directional signals, which travel in opposite directions, in a manner that a transmission light is refracted while passing through the external filter 20 and a reception light is reflected and thus travels in a different path.

The light generation unit 30 is configured to transmit light and may be provided as a laser diode (LD) for transmitting light to the optical waveguide 10.

The light detection unit 40 is configured to receive light and may be provided as a photo diode (PD) for detecting light from the optical waveguide 10.

A transmission signal is output in the form of an optical signal, which is converted from an electrical signal by the light generation unit 30. The transmission signal passes through the external filer 20 and then is transmitted through the core 11 of the optical waveguide 10.

A reception signal is received through the core 11 of the optical waveguide 10 and reflected by the external filter 20 and thus travels in a different path. After that, the reception signal provided in the form of an optical signal is converted to an electric signal by the light detection unit 40. In that manner, a bi-directional communication through a single optical waveguide 10 is achieved.

However, since the bi-directional optical transceiver is implemented based on using free space optics system, in which optical signals are divided by the external filter 20 installed among the optical waveguide 10, the light generation unit 30 and the light detection unit 40, the performance of the optical transceiver is dependant on the position of components of the optical transceiver.

In particular, the optical components need to be manually aligned such that transmission signals output from the light generation unit 30 pass through the core 11 having a very small diameter. However, the use of the external filter causes difficulties in aligning the optical components and realizing a compact sized bi-directional optical transceiver.

In this regard, a study has been pursued to provide an optical waveguide and an optical transceiver, in which the manual alignment of optical components are easily achieved and thus that can be miniaturized and can effectively transmit and receive light by facilitating a manual alignment for optical components.

SUMMARY

Accordingly, in one aspect, there is provided an optical waveguide and an optical transceiver, which can be miniaturized and effectively transmit and receive light by facilitating a manual alignment for optical components.

In one general aspect, there is provided an optical waveguide including a core in which a wavelength selective filter is accommodated to divide bi-directional signals.

In another general aspect, there is provided an optical transceiver including an optical waveguide. The optical waveguide has a core in which a wavelength selective filter is accommodated to divide bi-directional signals.

As apparent through above, a wavelength selective filer is provided in the core of the optical waveguide to divide bi-directional signals, so that light can be effectively transmitted/received and a compact sized optical transceiver can be realized.

Other objects, features and advantages will be apparent from the following description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

In the following description, a detailed description of known functions and configurations incorporated herein will be omitted when it may obscure the subject matter with unnecessary detail.

Before describing the exemplary embodiments, terms used throughout this specification are defined. These terms are defined in consideration of functions according to exemplary embodiments, and can be varied according to a purpose of a user or manager, or a relevant standard and so on. Therefore, definitions of the terms should be made on the basis of the overall context.

An optical waveguide refers to a transmission line such as optical fiber for transmitting optical signals.

A bi-directional optical transceiver is a device capable of transmitting and receiving optical signals using a single optical waveguide.

A cladding mode refers to the type of optical signals being transferred inside a cladding.

A core mode refers to the type of optical signals being transmitted inside a core.

Figure 1:
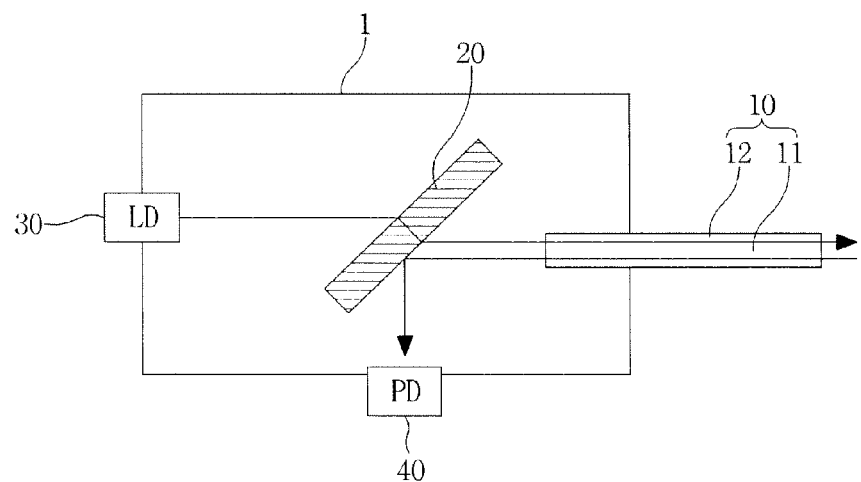
FIG. 1 is a view illustrating a bi-directional optical transceiver according to the related art.
Figure 2:
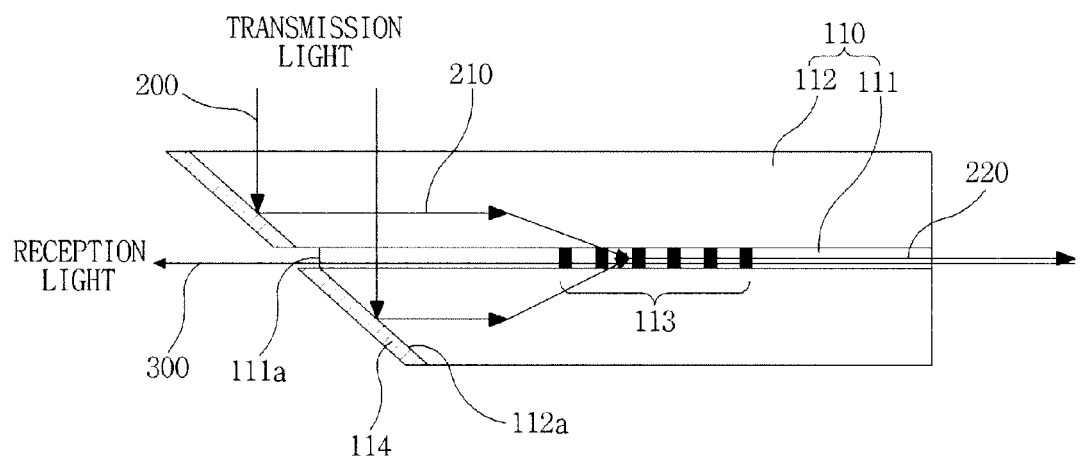
FIGS. 2 and 3 are views illustrating an exemplary optical waveguide.
Figure 3:
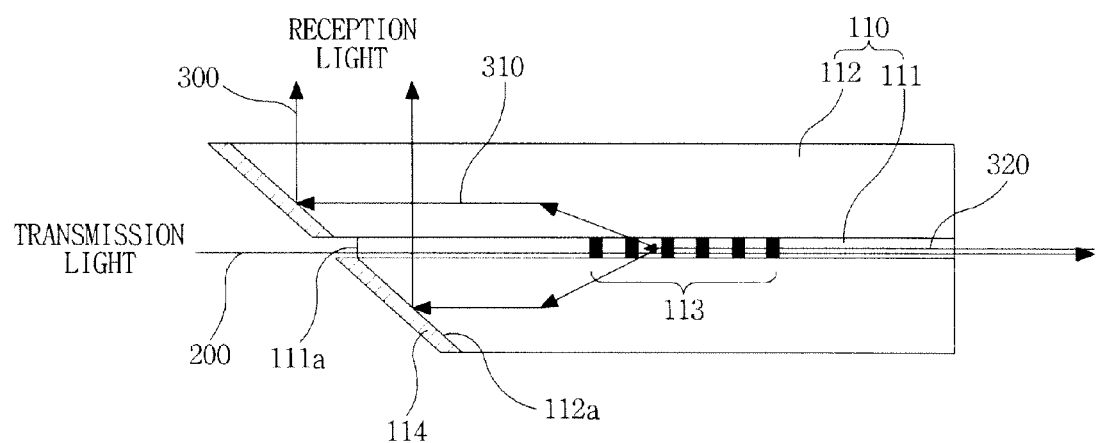

FIGS. 2 and 3 are views illustrating an exemplary optical waveguide. FIGS. 2 and 3 are views illustrating configurations, in which a light generation unit is put in place of a light detection unit.

As shown in FIGS. 2 and 3, an optical waveguide 110 includes a core 111, a cladding 112 and a wavelength selective filter 113. The core 111 is used to transmit light. The cladding 112 surrounds the core 111, thereby confining light inside the core 111 through total internal reflection.

The wavelength selective filter 113 is accommodated in the core 111 to divide bi-directional signals. For example, the wavelength selective filter 113 may be a long period grating (LPG) filter.

As shown in FIG. 2, the wavelength selective filter 113 converts light 200 of a cladding mode 210 travelling along the cladding 112 into light 200 of a core mode 220. Alternatively, as shown in FIG. 3, the wavelength selective filter 113 converts light 300 of a core mode 320 travelling along the core 111 into light 300 of a cladding mode 310.

Meanwhile, light, which travels in a direction opposite to a travelling direction of the light converted by the wavelength selective filter 113, passes through the wavelength selective filter 113 without being converted.

As described above, the optical waveguide 110 is provided with the wavelength selective filter 113 for separating signals travelling in opposite directions, so that the manual alignment for optical components are easily realized and thus transmission/reception performance of light is improved and the optical waveguide 110 can be miniaturized.

According to another exemplary embodiment, the cladding 112 may have an angled end 112a. That is, as shown in FIG. 2, the light 200, which is incident perpendicular to an extension direction of the optical waveguide 110, is reflected at the angled end 112a of the cladding 112 in perpendicular to the path of the incident light and is therefore converted into light 200 of a cladding mode 210. Alternatively, as shown in FIG. 3, the light 300 of a cladding mode 310, which has been converted from the light 300 of a core mode 320 by the wavelength selective filter 113, is reflected in perpendicular to the path of the light and is therefore output.

As described above, the angled end 112a of the cladding 112 allows the path of transmission light 200 or reception light 300 to be changed, thereby achieving the bi-directional transmission in the optical waveguide 110. In the conventional optical waveguide, light needs to be directly input light into a core having a small diameter and thus complicates a manual alignment of the optical components. However, according to the present invention, even if the light is input into the cladding 112 having a relatively large diameter, the light is effectively transmitted along the light waveguide 110. That is, the margin allowable for aligning the optical components is large and thus manual alignment for the optical components is facilitated.

If a collimator (not shown) is installed on a portion of the optical waveguide 10 receiving the light, which has been output from the light generating unit, the light is effectively introduced to the cladding 112. Alternatively, if a lens (not shown) is installed on a portion of the optical is waveguide 110 emitting the light, which is to be input to the light detection unit, the light is effectively output.

According to another exemplary embodiment, the core 111 is provided with an etched end 111a adjacent to the angled end 112a of the cladding 112 and the etched end 111a has a predetermined shape of a cross section.

Figure 4:
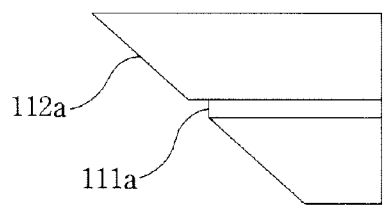
FIGS. 4 to 7 are sectional views illustrating etched ends of cores, which are adjacent to an angled end of a cladding and have various cross sections.
Figure 5:
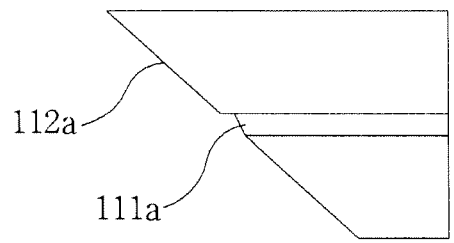

As shown in FIG. 4, the etched end 111a may have a cross section perpendicular to an extension line of the optical waveguide. As shown in FIG. 5, the etched end 111a may have a cross section angled with respect to the extension direction of the optical waveguide.

Figure 6:
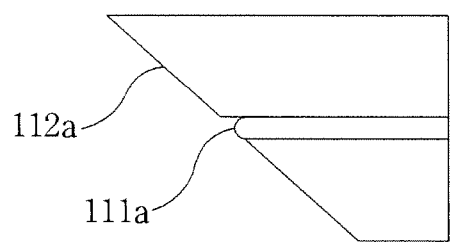
Figure 7:
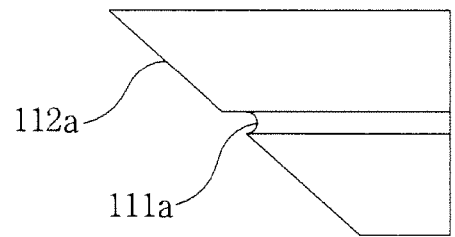

As shown in FIG. 6, the etched end 111a may have a convex cross section. As shown in FIG. 7, the etched end 111a may have a concave cross section 111a.

According to the present embodiment, the core 111 has the etched end 111a, which is formed adjacent to the angled end 112a of the cladding 112 through a dry etching scheme, a wet etching scheme or a laser processing. Therefore, the light generation unit for outputting light or the light detection unit for detecting light can be effectively coupled to the optical waveguide, thus facilitating the manual alignment of the optical components.

According to another exemplary embodiment, the optical waveguide 110 may further include a mirror or a filter 114, coupled to the angled end 112a of the cladding 112.

The mirror or filter 114 installed on the angled end 112a of the cladding 112 allows the light to be reflected regardless of the total internal reflection condition, so that the operational to efficiency of the cladding is enhanced.

Figure 8:
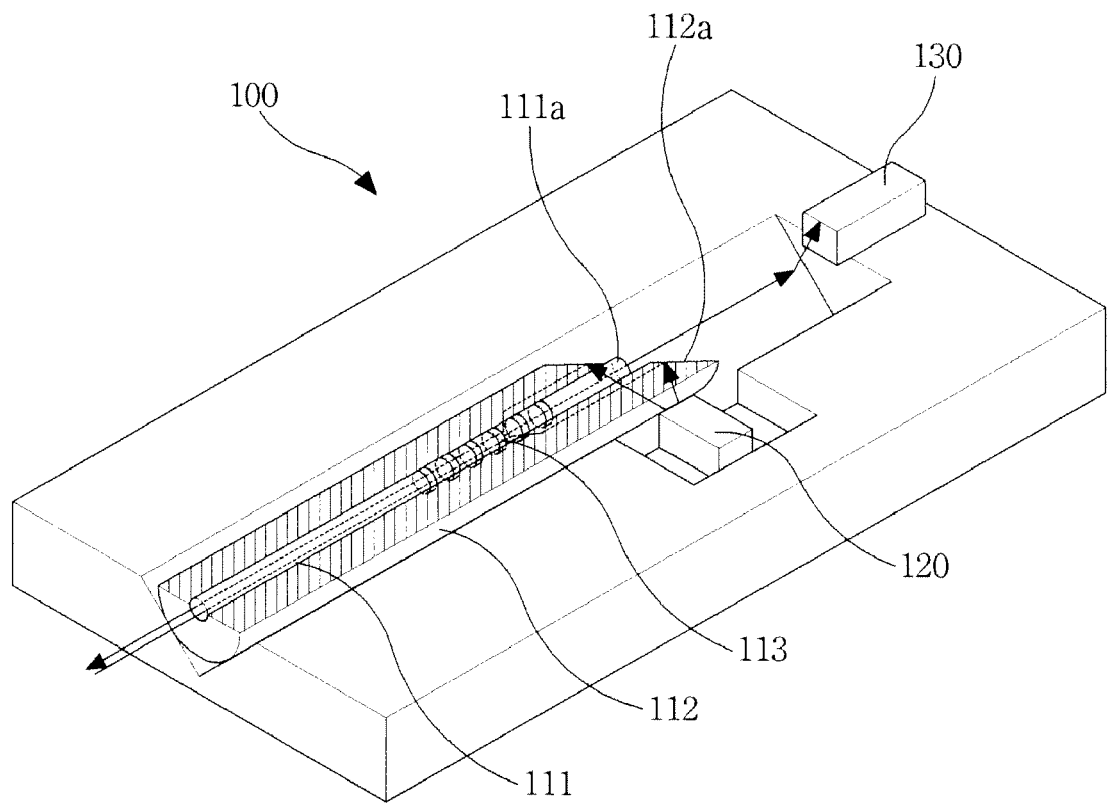
FIG. 8 is a perspective view showing a portion of the bi-directional transceiver according to an exemplary embodiment.

Hereinafter, a bi-directional transceiver having the optical waveguide will be described with reference to FIG. 8. FIG. 8 is a perspective view showing a portion of the bi-directional transceiver according to an exemplary embodiment.

The bi-directional transceiver 100 is a device for transmitting and receiving optical signals using a single optical waveguide as shown in FIG. 8. The bi-directional transceiver 100 includes the optical waveguide 110, a light generation unit 120 and a light detection unit 130.

The optical waveguide 110 includes the core 111 for transmitting light, the cladding 112 surrounding the core 111 to confine light inside the core 111 through total internal reflection, and the wavelength selective filter 113 accommodated in the core 111 to divide bi-directional signals. For example, the wavelength selective filter 113 may be a long period grating (LPG) filter.

The light generation unit 120 is configured to output light to the optical waveguide 110. For example, the light generation unit 120 converts electrical signals into optical signals by using a laser diode (LD) and then outputs the optical signals to the optical waveguide 110.

The light detection unit 130 is configured to detect light of the optical waveguide 110. For example, the light detection unit 130 converts the optical signals transmitted along the optical waveguide 110 into electrical signals by using a photodiode (PD).

According to the present embodiment, light (210, in FIG. 2), which has been output from the light generation unit 120 and then travels along the cladding 112, is converted by the wavelength selective filter 113 into light (220, in FIG. 2) of a core mode. Alternatively, as shown in FIG. 3, light (320, in FIG. 3) in a core mode, which travels along the core 111, is converted by the wavelength selective filter 113 into light (310, in FIG. 3) of a cladding mode. The light (310, in FIG. 3) of a cladding mode is detected by the light detection unit 130.

Meanwhile, light, which travels in a direction opposite to a travelling direction of the light converted by the wavelength selective filter 113, passes through the wavelength selective filter 113 without conversion.

As described above, the wavelength selective filter is provided in the core of the optical waveguide 110 such that signals travelling in opposite directions are divided, thereby facilitating manual alignment of the optical components, so that light transmission/reception performance can be improved and the optical waveguide 110 can be miniaturized.

According to another exemplary embodiment, the cladding 112 may have an angled end 112a. That is, as shown in FIG. 2, the light 200, which is incident perpendicular to an extension direction of the optical waveguide 110, is reflected at the angled end 112a of the cladding 112 in perpendicular to the path of the incident light and is therefore converted into light 200 of a cladding mode 210. Alternatively, as shown in FIG. 3, the light 300 of a cladding mode 310, which has been converted from the light 300 of a core mode 320 by the wavelength selective filter 113, is reflected in perpendicular to the path of the light and is therefore output.

As described above, the angled end 112a of the cladding 112 allows the path of transmission light 200 or reception light 300 to be changed, thereby achieving the bi-directional transmission in the optical waveguide 110. In the conventional optical waveguide, light needs to be directly input light into a core having a small diameter and thus complicates a manual alignment of the optical components. However, according to the present invention, even if the light is input into the cladding 112 having a relatively large diameter, the light is effectively transmitted along the light waveguide 110. That is, the margin allowable for aligning the optical components is large and thus manual alignment for the optical components is facilitated.

If a collimator (not shown) is installed on a portion of the optical waveguide 10 receiving the light, which has been output from the light generating unit, the light is effectively introduced to the cladding 112. Alternatively, if a lens (not shown) is installed on a portion of the optical waveguide 110 emitting the light, which is to be input to the light detection unit, the light is effectively output.

According to another exemplary embodiment, the core 111 is provided with an etched end 111a adjacent to the angled end 112a of the cladding 112 and the etched end 111a has a predetermined shape of a cross section.

As shown in FIG. 4, the etched end 111a may have a cross section perpendicular to an extension line of the optical waveguide. As shown in FIG. 5, the etched end 111a may have a cross section angled with respect to the extension direction of the optical waveguide.

As shown in FIG. 6, the etched end 111a may have a convex cross section. As shown in FIG. 7, the etched end 111a may have a concave cross section 111a.

According to the present embodiment, the core 111 has the etched end 111a, which is formed adjacent to the angled end 112a of the cladding 112 through a dry etching scheme, a wet etching scheme or a laser processing. Therefore, the light generation unit for outputting light or the light detection unit for detecting light can be effectively coupled to the optical waveguide, thus facilitating the manual alignment of the optical components.

According to another exemplary embodiment, the optical waveguide 110 may further include a mirror or a filter 114, coupled to the angled end 112a of the cladding 112.

The mirror or filter 114 installed on the angled end 112a of the cladding 112 allows the light to be reflected regardless of the total internal reflection condition, so that the operational efficiency of the cladding is enhanced.

As apparent from the above description, since the wavelength selective filer is provided in the core of the optical waveguide, signals travelling in opposite directions are divided, so that light can be effectively transmitted and received and a compact sized optical transceiver can be realized.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical waveguide comprising:
   a core to transmit light, the core including an etched end;
   a cladding to constrain light inside the core through total internal reflection while surrounding the core, the cladding including an angled end; and
   a wavelength selective filter accommodated in the core to divide bi-directional signals,
   wherein (i) incident light being perpendicular to the direction of the optical waveguide is reflected at the angled end in a path parallel to an extension direction of the optical waveguide, and (ii) incident light being parallel to the direction of the optical waveguide is reflected at the angled end in a path perpendicular to the extension direction of the optical waveguide, and
   wherein a cross section of the etched end is different from a cross section of the angled end.

2. The optical waveguide of claim 1, wherein the etched end is adjacent to the angled end of the cladding.

3. The optical waveguide of claim 2, wherein the cross section of the etched end is perpendicular to the extension line of the optical waveguide.

4. The optical waveguide of claim 2, wherein the cross section of the etched end is angled with respect to the extension line of the optical waveguide.

5. The optical waveguide of claim 2, wherein the etched end has a convex cross section.

6. The optical waveguide of claim 2, wherein the etched end has a concave cross section.

7. The optical waveguide of claim 1, further comprising a mirror or a filter coupled to the angled end of the cladding.

8. The optical waveguide of claim 1, wherein the wavelength selective filter is a long period grating filter.

9. A bi-directional optical transceiver comprising:
   an optical waveguide including
      a core to transmit light, the core including an etched end,
      a cladding to constrain light inside the core through total internal reflection while surrounding the core, the cladding including an angled end, and
      a wavelength selective filter accommodated in the core to transmit or block signals travelling in opposite directions;
   a light generation unit to output light to the optical waveguide; and
   a light detection unit to detect light from the optical waveguide,
   wherein (i) incident light being perpendicular to the direction of the optical waveguide is reflected at the angled end in a path parallel to an extension direction of the optical waveguide, and (ii) incident light being parallel to the direction of the optical waveguide is reflected at the angled end in a path perpendicular to the extension direction of the optical waveguide, and
   wherein a cross section of the etched end is different from a cross section of the angled end.

10. The bi-directional optical transceiver of claim 9, wherein the core etched end is adjacent to the angled end of the cladding.

11. The bi-directional optical transceiver of claim 10, wherein the cross section of the etched end is perpendicular to the extension line of the optical waveguide.

12. The bi-directional optical transceiver of claim 10, wherein the cross section of the etched end is angled with respect to the extension line of the optical waveguide.

13. The bi-directional optical transceiver of claim 10, wherein the etched end has a convex cross section.

14. The bi-directional optical transceiver of claim 10, wherein the etched end has a concave cross section.

15. The bi-directional optical transceiver of claim 9, further comprising a mirror or a filter coupled to the angled end of the cladding.

16. The bi-directional optical transceiver of claim 9, wherein the wavelength selective filter is a long period grating filter.

* * * * *